United States Patent
Nakamata et al.

(10) Patent No.: US 9,194,236 B2
(45) Date of Patent: Nov. 24, 2015

(54) TURBINE BLADE

(75) Inventors: Chiyuki Nakamata, Tokyo (JP); Shu Fujimoto, Tokyo (JP)

(73) Assignee: IHI CORPORATION (JP)

( * ) Notice: Subject to any disclaimer, the term of this patent is extended or adjusted under 35 U.S.C. 154(b) by 343 days.

(21) Appl. No.: 13/501,519

(22) PCT Filed: Oct. 7, 2010

(86) PCT No.: PCT/JP2010/067659
§ 371 (c)(1),
(2), (4) Date: Apr. 12, 2012

(87) PCT Pub. No.: WO2011/046063
PCT Pub. Date: Apr. 21, 2011

(65) Prior Publication Data
US 2012/0201694 A1   Aug. 9, 2012

(30) Foreign Application Priority Data
Oct. 16, 2009   (JP) .............................. P2009-239124

(51) Int. Cl.
F01D 5/18   (2006.01)

(52) U.S. Cl.
CPC .......... F01D 5/187 (2013.01); *F05D 2230/211* (2013.01); *F05D 2240/122* (2013.01); *F05D 2240/304* (2013.01); *F05D 2250/185* (2013.01); *F05D 2260/2214* (2013.01); *F05D 2260/22141* (2013.01); *Y02T 50/673* (2013.01); *Y02T 50/676* (2013.01)

(58) Field of Classification Search
CPC .................................. F01D 5/18; F01D 5/187
USPC ................. 416/97 R, 96 R, 95; 415/115, 116
See application file for complete search history.

(56) References Cited

U.S. PATENT DOCUMENTS

| | | | |
|---|---|---|---|
| 4,203,706 A | 5/1980 | Hess | 416/97 |
| 4,407,632 A | 10/1983 | Liang | 416/97 R |
| 4,752,186 A * | 6/1988 | Liang | 416/97 R |
| 5,752,801 A * | 5/1998 | Kennedy | 415/115 |

(Continued)

FOREIGN PATENT DOCUMENTS

| | | |
|---|---|---|
| CN | 1126795 A | 7/1996 |
| CN | 1477292 A | 2/2004 |

(Continued)

OTHER PUBLICATIONS

International Search Report and Written Opinion mailed Dec. 21, 2010 in corresponding PCT International Application No. PCT/JP2010/067659.

(Continued)

*Primary Examiner* — Dwayne J White
*Assistant Examiner* — Michael Sehn
(74) *Attorney, Agent, or Firm* — Ostrolenk Faber LLP

(57) ABSTRACT

Disclosed is a turbine blade capable of being cooled by a coolant gas supplied to a hollow region, wherein a plurality of meandering flow paths that guide the coolant gas between the suction wall surface and the pressure wall surface while causing the coolant gas to repeatedly meander are continuously arranged from the hub side toward the tip side of the turbine blade, and the meandering flow paths adjacent to each other cause the coolant gas to meander in different repetitive patterns.

5 Claims, 9 Drawing Sheets

(56) References Cited

U.S. PATENT DOCUMENTS

| | | | |
|---|---|---|---|
| 7,255,535 B2 | 8/2007 | Albrecht et al. | 416/97 R |
| 7,293,962 B2* | 11/2007 | Fried et al. | 416/97 R |
| 7,438,527 B2* | 10/2008 | Albert et al. | 416/97 R |
| 7,713,026 B1 | 5/2010 | Liang | 416/1 |
| 2009/0060715 A1* | 3/2009 | Kopmels | F01D 5/187 415/115 |
| 2009/0068022 A1* | 3/2009 | Liang | F01D 5/187 416/97 R |
| 2009/0126335 A1* | 5/2009 | Fujimoto et al. | 60/39.83 |

FOREIGN PATENT DOCUMENTS

| | | |
|---|---|---|
| CN | 1654784 A | 8/2005 |
| CN | 1995708 A | 7/2007 |
| JP | 10-311203 | 11/1998 |
| JP | 2002-516944 | 6/2002 |
| WO | WO 2007/094212 | 8/2007 |

OTHER PUBLICATIONS

Chinese Office Action, dated Dec. 4, 2013, issued in corresponding Chinese Patent Application No. 201080046021.7. English translation of Search Report. Total 8 pages.

Japanese Notice of Allowance, dated Apr. 15, 2014, issued in corresponding Japanese Patent Application No. 2013-162347. English translation. Total 6 pages.

* cited by examiner

TURBINE BLADE

CROSS-REFERENCE TO RELATED APPLICATIONS

The present application is a 35 U.S.C. §§371 national phase conversion of PCT/JP2010/067659, filed Oct. 7, 2010, which claims priority of Japanese Patent Application No. 2009-239124, filed Oct. 16, 2009, the contents of which are incorporated herein by reference. The PCT International Application was published in the Japanese language.

TECHNICAL FIELD

The present invention relates to a turbine blade that can be cooled by coolant gas supplied to a hollow region.

BACKGROUND ART

A turbine blade of a turbine, which is mounted on a jet engine or the like, is provided with various countermeasures against heat due to its exposure to a high-temperature gas such as a combustion gas generated at a combustor.

These countermeasures include cooling methods to suppress the overheating of the turbine blade by forming a hollow region in the turbine blade and supplying a coolant gas to the hollow region. One of those cooling methods is an impingement cooling method. The impingement cooling method has been known as a cooling method by which high cooling performance is obtained. However, since parts called inserts need to be inserted into a blade, the shape of the blade is limited when the impingement cooling method is used. In the present aerodynamic design of a blade, the blade generally has a complicated three-dimensional shape in order to improve blade element performance. For this reason, the impingement cooling method restricts the aerodynamic design of a blade since the shape of a blade is limited so that inserts can be inserted into the blade.

A technique disclosed in WO 2007/094212 A1, (page 19, FIG. 10), is proposed as a technique that delivers the same cooling performance as the cooling performance of the impingement cooling method while making up for the shortcomings of the impingement cooling method.

Specifically, a structure, which improves cooling efficiency by causing a coolant gas to repeatedly meander between a suction wall surface and a pressure wall surface while guiding the coolant gas toward a trailing edge side from a leading edge side of a turbine blade, is disclosed in WO 2007/094212 A1, (page 19, FIG. 10).

SUMMARY OF INVENTION

Technical Problem

In WO 2007/094212 A1, (page 19, FIG. 10), slot portions, which extend to the tip side from the hub side of the turbine blade, are alternately formed on the pressure wall surface and the suction wall surface, so that a meandering flow path is formed.

Further, the slot portions are formed so as to be supported by any one of the pressure wall surface and the suction wall surface in the form of a cantilever and extend in a height direction of a turbine blade (a direction where the hub side and the tip side of the turbine blade are connected to each other).

A turbine blade including the hollow region is manufactured by casting using a core that is made of ceramics or the like. For this reason, when a plurality of slot portions are formed in the hollow region as described above, a plurality of protruding portions extending in the height direction of the turbine like the slot portions need to be formed on a core.

However, since the core is made of ceramics or the like and the protruding portions extend in the height direction of the turbine so as to be supported by a surface corresponding to the suction wall surface of the turbine blade or a surface corresponding to the pressure wall surface of the turbine blade in the form of a cantilever, particularly, stress is apt to be applied to a curved portion.

Accordingly, there is a possibility that the shape is limited in terms of the strength of the core. Further, even though the core is capable of being manufactured, the yield of the core may deteriorate.

The invention has been made in consideration of the above-mentioned problems, and an object of the invention is to increase the degree of freedom in the design of an internal structure by proposing a structure for which the rigidity of a core is increased and to further improve the cooling efficiency of the turbine blade by using an optimal structure.

Solution to Problem

The invention employs the following structure as means for solving the problems.

According to a first aspect of the present invention, there is provided a turbine blade that is capable of being cooled by a coolant gas supplied to a hollow region of the turbine blade. The turbine blade includes: a pressure wall surface; a suction wall surface; the hollow region; and a plurality of meandering flow paths that guide the coolant gas between the suction wall surface and the pressure wall surface, while causing the coolant gas to repeatedly meander, continuously arranged from a hub side toward a tip side of the turbine blade. The meandering flow paths adjacent to each other cause the coolant gas to meander in different repetitive patterns.

According to a second aspect of the present invention, in the first aspect, repetitive patterns of the meandering flow paths adjacent to each other may have the same periodicity and the phases of the repetitive patterns may be shifted from each other by a half period.

According to a third aspect of the present invention, in the first aspect, repetitive patterns of the meandering flow paths adjacent to each other may have the same periodicity and the phases of the repetitive patterns may be shifted from each other by a quarter period.

According to a fourth aspect of the present invention, in any one of the first to third aspects, widths of protruding portions protruding from the suction wall surface and the pressure wall surface, which are a part of wall portions forming the meandering flow path, may be set to be larger than a width of a flow path that is directed to the pressure wall surface from the suction wall surface of the meandering flow path and a width of a flow path that is directed to the suction wall surface from the pressure wall surface of the meandering flow path.

Advantageous Effects of Invention

According to the aspects of the present invention, the plurality of meandering flow paths are continuously arranged in the height direction of the turbine blade (a direction where the hub side and the tip side of the turbine blade are connected to each other) and the meandering flow paths adjacent to each other cause the coolant gas to meander in different repetitive patterns.

That is, according to the aspects of the present invention, in the meandering flow paths adjacent to each other, the arrangement patterns of the protruding portions (slot portions) protruding from the suction wall surface or the pressure wall surface are different from each other. For this reason, the protruding portions are disposed so as to be discretized in the height direction of the turbine blade. Accordingly, slot portions, which are supported by the suction wall surface or the pressure wall surface in the form of a cantilever and extend in the height direction, do not need to be provided unlike in the turbine blade in the related art.

Therefore, protruding portions, which linearly extend in the height direction, do not need to be formed on the surface, which corresponds to the pressure wall surface, of a core that is used to manufacture the above-mentioned turbine blade. That is, particularly brittle portions of a core in the related art do not need to be formed. Accordingly, for example, when a core is allowed to have substantially the same brittleness as the brittleness of the core in the related art, an interval between the protruding portions of the core may be made narrow, that is, miniaturization becomes possible.

As described above, according to the aspects of the present invention, it is possible to increase the degree of freedom in the design of an internal structure by proposing a structure for which the rigidity of a core is increased and to further improve the cooling efficiency of the turbine blade by using an optimal structure.

DESCRIPTION OF EMBODIMENTS

An embodiment of a turbine blade according to the invention will be described below with reference to the drawings. The scale of each of the members is appropriately changed in the following drawings to show each of the members with a recognizable size.

First Embodiment

Figure 1:
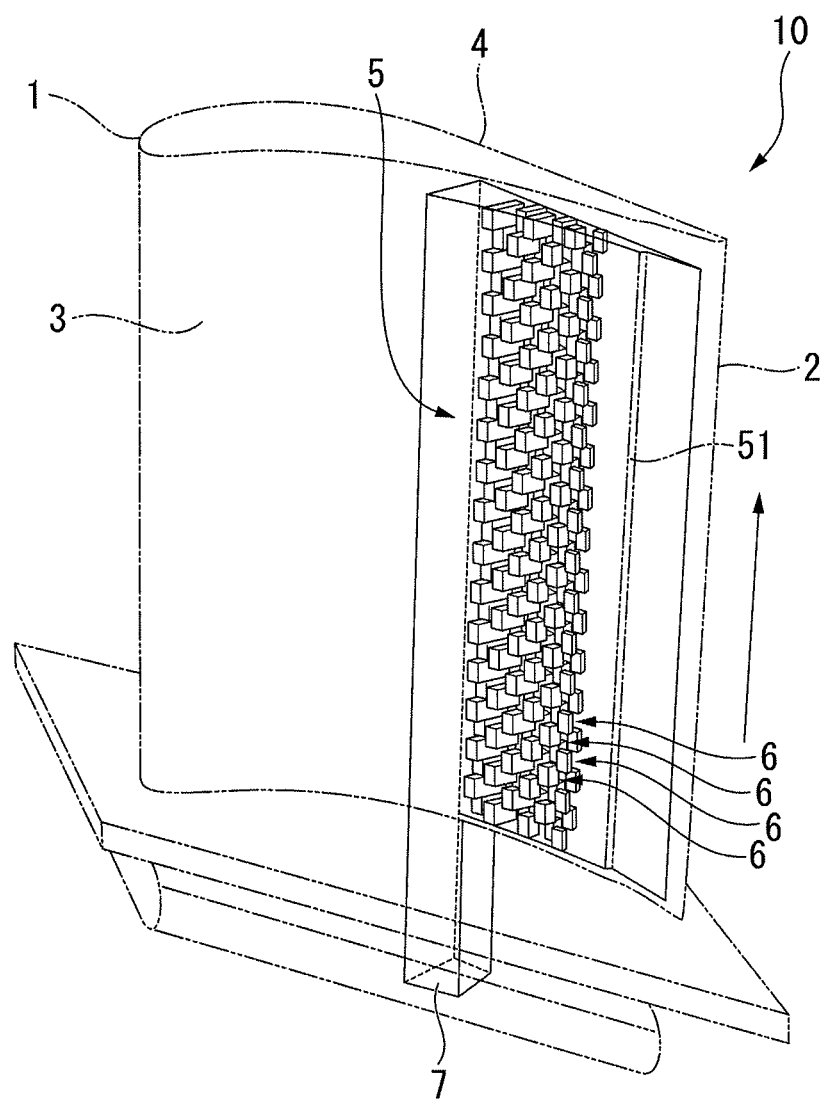
FIG. 1 is a perspective view showing the structure of a turbine blade according to a first embodiment of the invention.

FIG. 1 is a perspective view showing the structure of a turbine blade 10 according to this embodiment.

The turbine blade 10 shown in FIG. 1 is a turbine rotor blade made of metal. The turbine blade according to the invention is not limited to a turbine rotor blade and may be applied to a turbine stator vane.

The turbine blade 10 includes a pressure wall 3 that is exposed to fluid flowing from a leading edge portion 1 toward a trailing edge portion 2 and is curved so as to be recessed on the front side of the plane of paper, and a suction wall 4 that is curved so as to swell on the rear side of the plane of paper. A direction (shown in FIG. 1 by an arrow) where a hub side, which is an inner diameter side of a rotating shaft of a turbine, is connected to a tip side, which is an outer diameter side of the rotating shaft, in FIG. 1 is the height direction of the turbine blade.

Further, the turbine blade 10 includes a hollow region 5 formed therein and a plurality of meandering flow paths 6 that are formed in the hollow region 5.

The hollow region 5 is an inner space of the turbine blade 10 that is formed from a substantially middle portion of the turbine blade 10 to the vicinity of the trailing edge portion 2 in a direction that is directed to the trailing edge portion 2 from the leading edge portion 1. A supply flow path 7, through which a coolant gas is supplied to the hollow region 5, is connected to a portion of the hollow region 5 which is closest to the leading edge portion 1. Further, a portion of the hollow region 5 which is closest to the trailing edge portion 2 forms an open end 51 that is formed to open toward the trailing edge portion 2.

Figure 3:
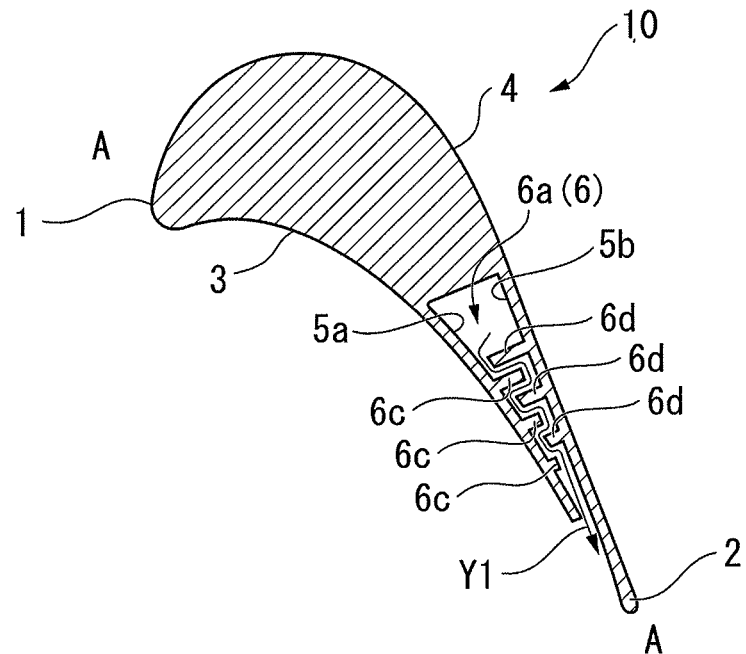
FIG. 3 is a cross-sectional view taken along a line A-A of FIG. 2.

The meandering flow paths 6 guide the coolant gas, which is supplied to the hollow region 5 through the supply flow path 7, toward the trailing edge portion 2 (trailing edge side) from the leading edge portion 1 (leading edge side) while causing the coolant gas to repeatedly meander between a suction wall surface 5b and a pressure wall surface 5a (see FIG. 3).

Further, in the turbine blade 10 according to this embodiment, the plurality of meandering flow paths 6 are continuously arranged in the height direction of the turbine blade 10 and the meandering flow paths adjacent to each other cause the coolant gas to meander in different repetitive patterns (meandering patterns).

Specifically, in the turbine blade 10 according to this embodiment, the repetitive patterns of the meandering flow paths 6 adjacent to each other have the same periodicity and the phases of the repetitive patterns are shifted from each other by a half period.

Figure 2:
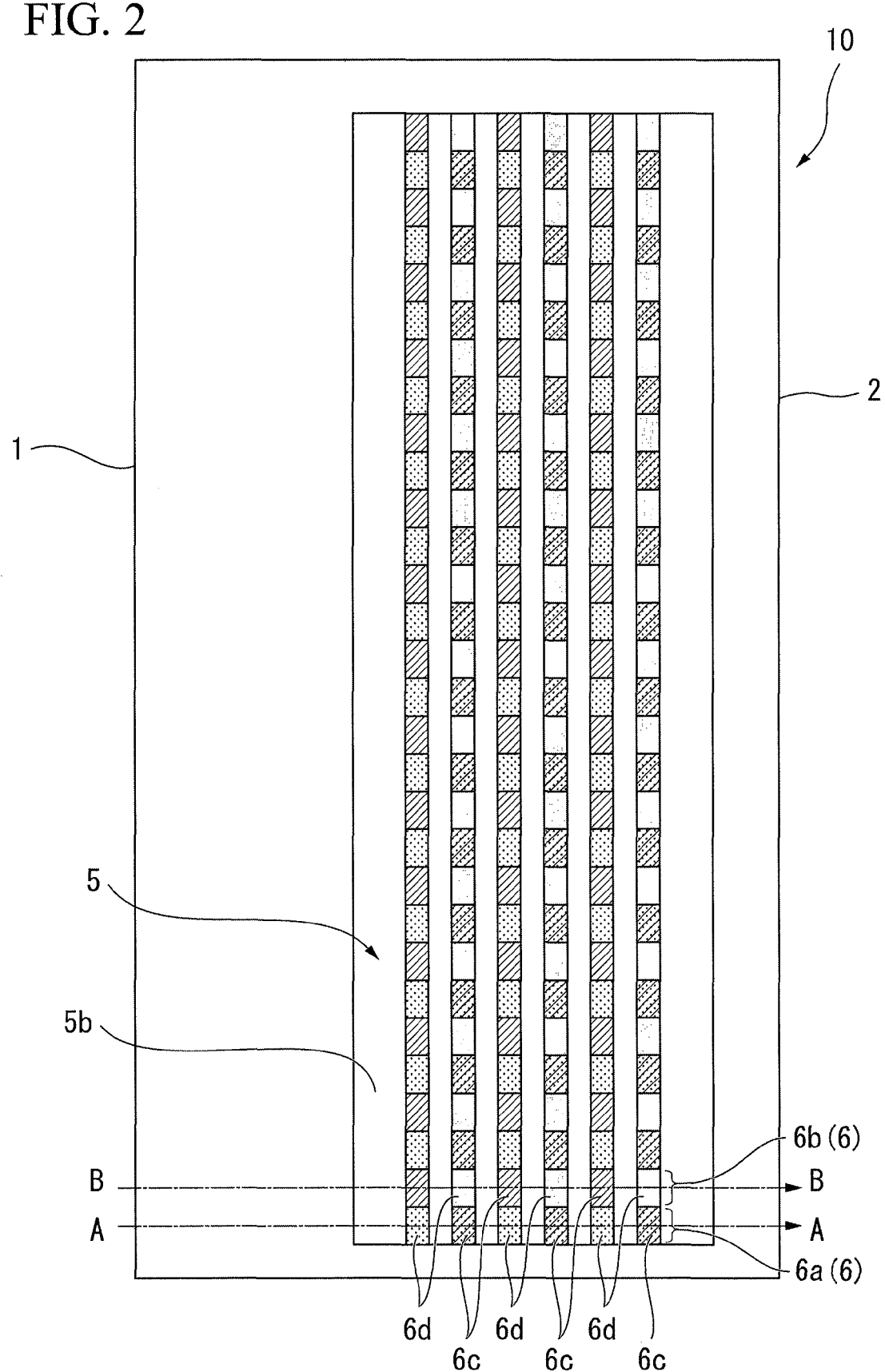
FIG. 2 is a view showing the turbine blade according to the first embodiment of the invention which is seen from the pressure side and from which a pressure wall is omitted.
Figure 4:
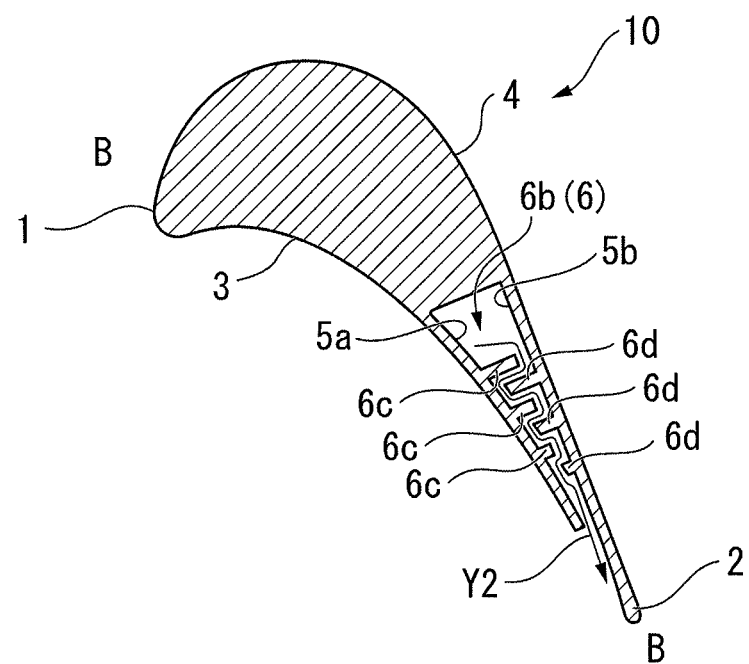
FIG. 4 is a cross-sectional view taken along a line B-B of FIG. 2.

More specifically, a description follows. FIG. 2 is a view showing the turbine blade 10 which is seen from the pressure side and from which the pressure wall 3 is omitted. Further, FIG. 3 is a cross-sectional view taken along a line A-A of FIG. 2, and is a cross-sectional view of a meandering flow path 6a, which is close to the hub side, of two adjacent meandering flow paths 6. FIG. 4 is a cross-sectional view taken along a line B-B of FIG. 2, and is a cross-sectional view of a meandering flow path 6b, which is close to the tip side, of the two adjacent meandering flow paths 6.

As shown in FIGS. 3 and 4, pressure side protruding portions 6c, which protrude from the pressure wall surface 5a of the hollow region 5 and of which end faces are separated from the suction wall surface 5b, and suction side protruding portions 6d, which protrude from the suction wall surface 5b of the hollow region 5 and of which end faces are separated from the pressure wall surface 5a, are alternately arranged, so that the meandering flow paths 6 are formed.

Meanwhile, for the purpose of easy understanding, in FIG. 2 (likewise in the following FIG. 5), the pressure side protruding portions 6c and the suction side protruding portions 6d, which form the meandering flow path 6a, are shown with a plurality of spots and the pressure side protruding portions 6c and the suction side protruding portions 6d, which form the meandering flow path 6b, are shown without spots. Further, the suction side protruding portions 6d, which form the meandering flow path 6b, are shown so as to be painted out.

FIG. 2 is a view showing the turbine blade 10 which is seen from the pressure side and from which the pressure wall 3 is omitted as described above, and the surfaces of the pressure side protruding portions 6c connected to the pressure wall 3 are shown with hatching.

Moreover, as shown in FIGS. 2 to 4, an arrangement interval between the pressure side protruding portion 6c and the suction side protruding portion 6d is set to be the same at the meandering flow path 6a and the meandering flow path 6b (that is, the repetitive patterns of the meandering flow paths 6 adjacent to each other have the same periodicity), and the pressure side protruding portions 6c and the suction side protruding portions 6d are alternately provided in the height direction of the turbine blade 10 (that is, the phases of the repetitive patterns of the meandering flow paths 6 adjacent to each other are shifted from each other by a half period).

Figure 5:
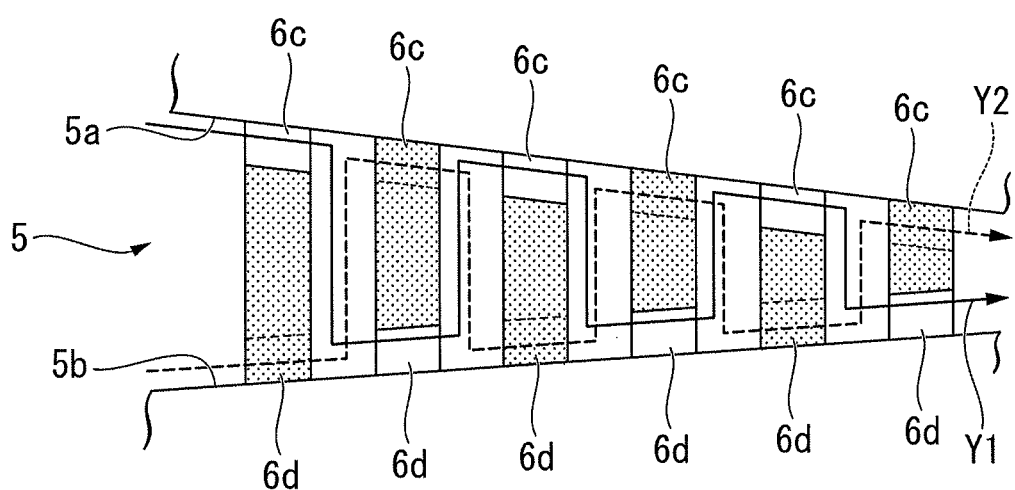
FIG. 5 is a schematic view of pressure side protruding portions and suction side protruding portions of the turbine blade according to the first embodiment of the invention when seen in the height direction of the turbine blade.

FIG. 5 is a schematic view of the pressure side protruding portions 6c and the suction side protruding portions 6d when seen in the height direction of the turbine blade 10. Further, as shown in FIG. 5, the pressure side protruding portions 6c and the suction side protruding portions 6d are disposed so as to overlap each other when seen in the height direction of the turbine blade 10.

In the turbine blade 10 according to this embodiment having the above-mentioned structure, the coolant gas supplied to the hollow region 5 through the supply flow path 7 flows to the trailing edge side from the leading edge side, repeatedly meanders between the suction wall surface 5b and the pressure wall surface 5a of the meandering flow path 6, and is then discharged to the outside.

Here, in the turbine blade 10 according to this embodiment, the repetitive pattern of the meandering flow path 6a and the repetitive pattern of the meandering flow path 6b adjacent to the meandering flow path 6a have the same periodicity and the phases of the repetitive patterns are shifted from each other by a half period.

For this reason, as shown in FIG. 5, the coolant gas Y2 flows toward the suction wall surface 5b from the pressure wall surface 5a of the meandering flow path 6b when the coolant gas Y1 flows toward the pressure wall surface 5a from the suction wall surface 5b of the meandering flow path 6a. Meanwhile, the coolant gas Y2 flows toward the pressure wall surface 5a from the suction wall surface 5b of the meandering flow path 6b when the coolant gas Y1 flows toward the suction wall surface 5b from the pressure wall surface 5a of the meandering flow path 6a.

According to the turbine blade 10 of this embodiment, the plurality of meandering flow paths 6 are continuously arranged in the height direction of the turbine blade 10, and the meandering flow paths 6 adjacent to each other cause the coolant gas to meander in different repetitive patterns.

That is, according to the turbine blade 10 of this embodiment, in the meandering flow paths 6 adjacent to each other, the arrangement patterns of the pressure side protruding portions 6c and the suction side protruding portions 6d are different from each other. For this reason, the pressure side protruding portions 6c and the suction side protruding portion 6d are disposed so as to be discretized in the height direction of the turbine blade 10. Accordingly, slot portions, which are supported by the suction wall surface or the pressure wall surface in the form of a cantilever and extend in the height direction, do not need to be provided unlike turbine blades in the related art.

Therefore, protruding portions, which linearly extend in the height direction, do not need to be formed on the surface, which corresponds to the pressure wall surface, of a core that is used to manufacture the above-mentioned turbine blade. That is, particularly brittle portions of a core in the related art do not need to be formed. Accordingly, for example, when a core is allowed to have substantially the same brittleness as the brittleness of the core in the related art, an interval between the protruding portions of the core may be made narrow, that is, miniaturization becomes possible.

As described above, according to the turbine blade 10 of this embodiment, it is possible to increase the degree of freedom in the design of an internal structure by proposing a structure of which the rigidity of a core is increased and to further improve the cooling efficiency of the turbine blade by using an optimal structure.

Second Embodiment

Next, a second embodiment of the invention will be described. Meanwhile, the description of the same portions as the portions of the first embodiment will be omitted or simplified in the description of this embodiment.

Figure 6:
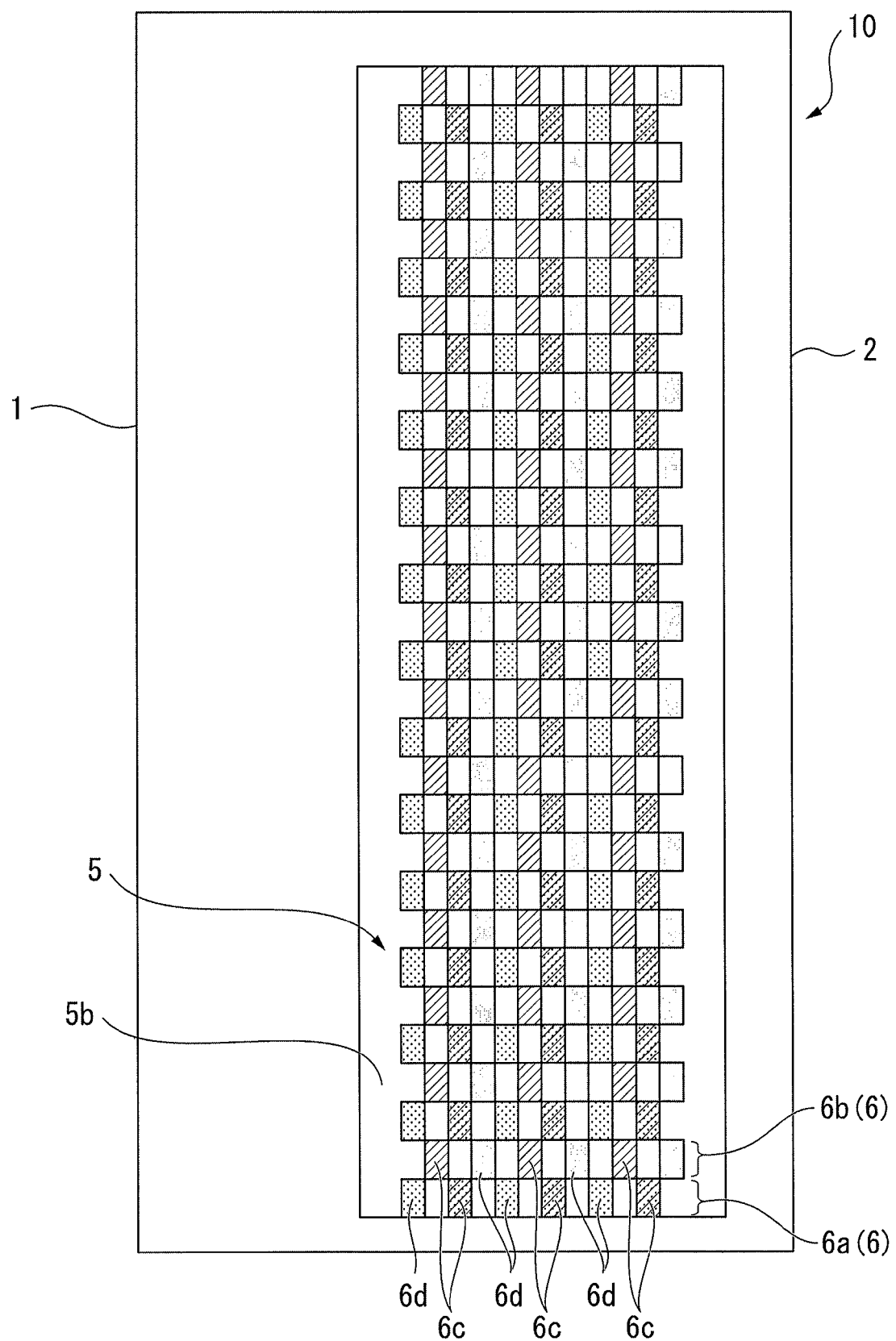
FIG. 6 is a view showing a turbine blade according to a second embodiment of the invention which is seen from the pressure side and from which a pressure wall is omitted.

FIG. 6 is a view showing a turbine blade 10 according to this embodiment which is seen from the pressure side and from which a pressure wall 3 is omitted. Further, FIG. 7 is a schematic view of pressure side protruding portions 6c and suction side protruding portions 6d of the turbine blade 10 when seen in the height direction of the turbine blade 10.

Figure 7:
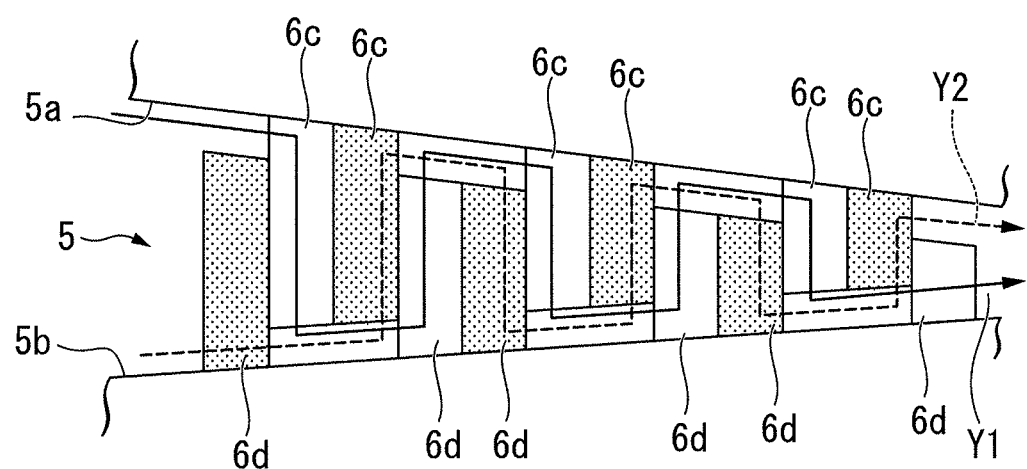
FIG. 7 is a schematic view of pressure side protruding portions and suction side protruding portions of the turbine blade according to the second embodiment of the invention when seen in the height direction of the turbine blade.

Furthermore, as shown in FIGS. 6 and 7, in the turbine blade 10 according to this embodiment, repetitive patterns of meandering flow paths 6a and 6b adjacent to each other have the same periodicity and the phases of the repetitive patterns are shifted from each other by a quarter period.

If this structure is employed, as shown in FIG. 7, the pressure side protruding portion 6c and the suction side protruding portion 6d of the meandering flow path 6b are disposed between the pressure side protruding portion 6c and the suction side protruding portion 6d of the meandering flow path 6a when seen in the height direction of the turbine blade 10.

For this reason, it is possible to suppress the movement of the coolant gas between the meandering flow paths 6a and 6b adjacent to each other. For example, if the turbine blade 10 is a rotor blade, a centrifugal force and the like are applied to the turbine blade 10. Accordingly, there is a possibility that the coolant gas may deviate in the hollow region 5. In contrast, according to the turbine blade 10 of this embodiment, it is possible to suppress the movement of the coolant gas between the meandering flow paths 6a and 6b adjacent to each other. Accordingly, it is possible to suppress the deviation of the coolant gas, so that it is possible to reliably cool the entire turbine blade 10.

Third Embodiment

Next, a third embodiment of the invention will be described. Meanwhile, the description of the same portions as the portions of the first and second embodiments will be omitted or simplified in the description of this embodiment.

Figure 8:
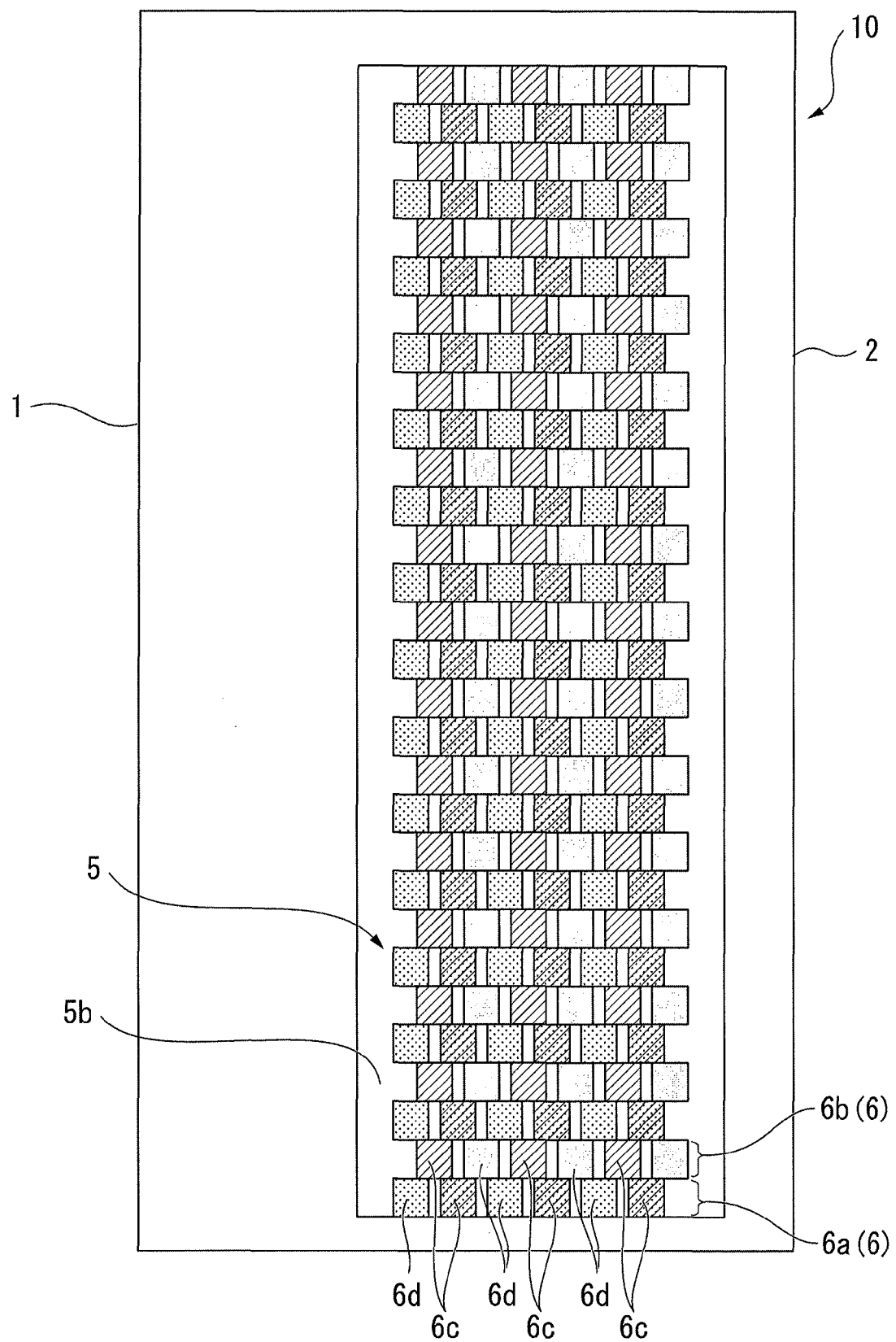
FIG. 8 is a view showing a turbine blade according to a third embodiment of the invention which is seen from the pressure side and from which a pressure wall is omitted.

FIG. 8 is a view showing a turbine blade 10 according to this embodiment which is seen from the pressure side and from which a pressure wall 3 is omitted. Further, FIG. 9 is a schematic view of pressure side protruding portions 6c and suction side protruding portions 6d of the turbine blade 10 when seen in the height direction of the turbine blade 10.

Figure 9:
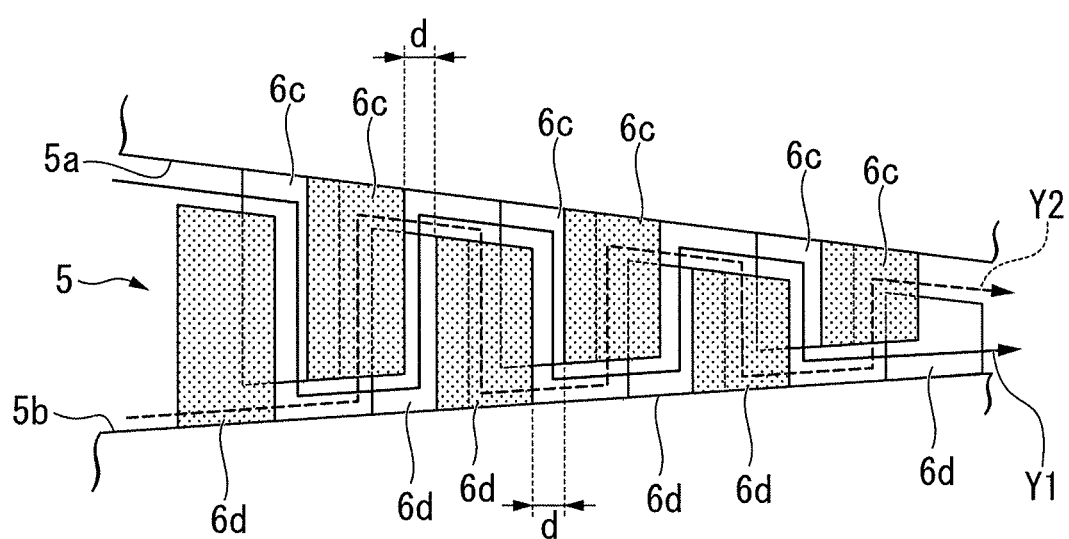
FIG. 9 is a schematic view of pressure side protruding portions and suction side protruding portions of the turbine blade according to the third embodiment of the invention when seen in the height direction of the turbine blade.

Furthermore, as shown in FIGS. 8 and 9, in the turbine blade 10 according to this embodiment, repetitive patterns of meandering flow paths 6a and 6b adjacent to each other have the same periodicity and the phases of the repetitive patterns are shifted from each other by a quarter period. In addition, the widths of the pressure side protruding portion 6c and the suction side protruding portion 6d are set to be larger than the width d of a flow path that is directed to a pressure wall surface 5a from a suction wall surface 5b of the meandering flow path 6 and the width d of a flow path that is directed to a suction wall surface 5b from a pressure wall surface 5a of the meandering flow path 6.

If this structure is employed, as shown in FIG. 9, the pressure side protruding portion 6c and the suction side protruding portion 6d of the meandering flow path 6b are disposed so as to overlap the pressure side protruding portion 6c and the suction side protruding portion 6d of the meandering flow path 6a when seen in the height direction of the turbine blade 10.

For this reason, it is possible to suppress the movement of the coolant gas between the meandering flow paths 6a and 6b, which are adjacent to each other, more than the turbine blade 10 according to the second embodiment.

Therefore, according to the turbine blade 10 of this embodiment, it is possible to suppress the movement of the coolant gas between the meandering flow paths 6a and 6b adjacent to each other. Consequently, it is possible to suppress the deviation of the coolant gas, so that it is possible to reliably cool the entire turbine blade 10.

Fourth Embodiment

Next, a fourth embodiment of the invention will be described. Meanwhile, the description of the same portions as the portions of the first to third embodiments will be omitted or simplified in the description of the fourth embodiment.

Figure 10:
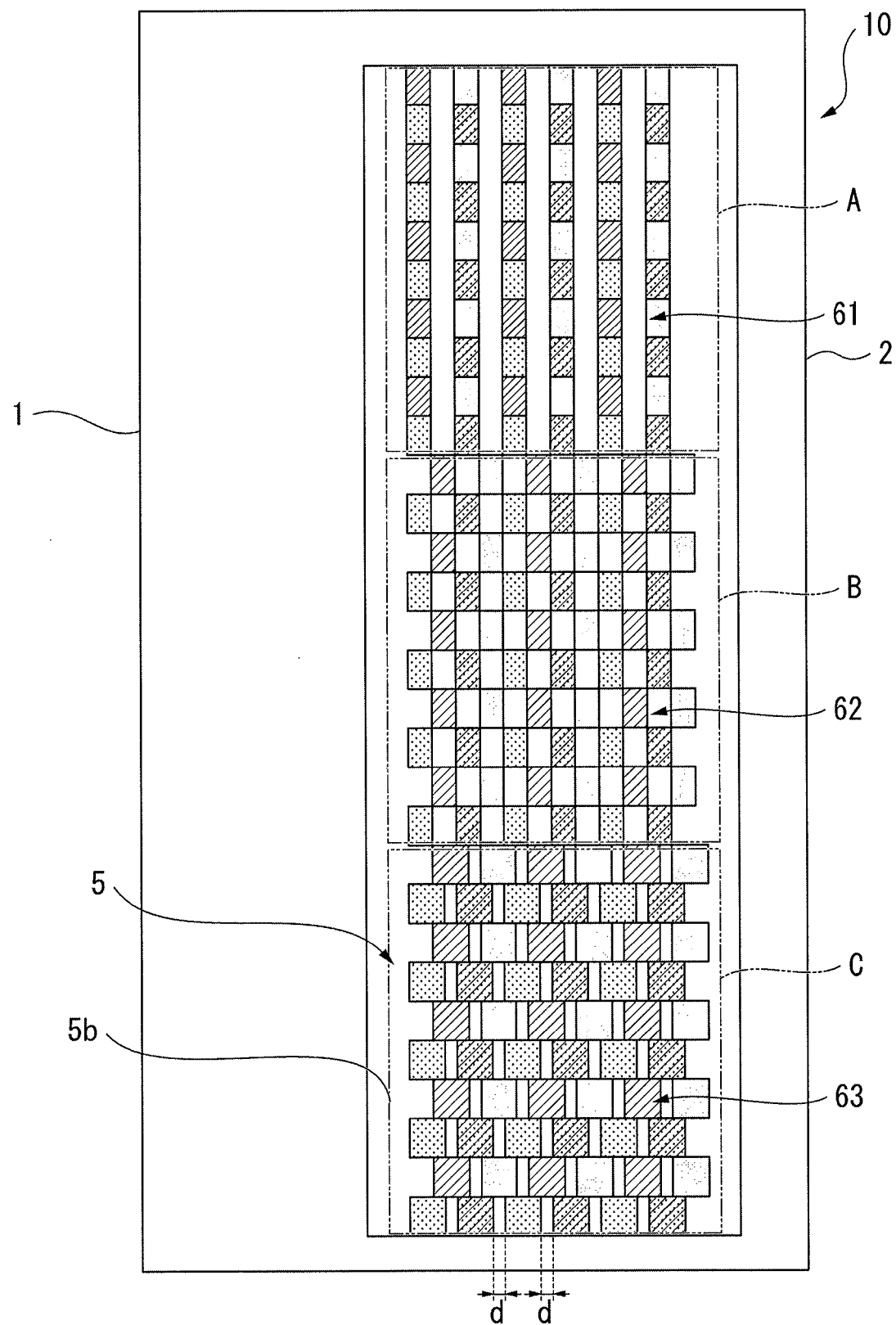
FIG. 10 is a view showing a turbine blade according to a fourth embodiment of the invention which is seen from the pressure side and from which a pressure wall is omitted.

FIG. 10 is a view showing a turbine blade 10 according to this embodiment which is seen from the pressure side and from which a pressure wall 3 is omitted.

As shown in FIG. 10, the turbine blade 10 according to this embodiment includes meandering flow paths 6 (meandering flow paths 61) of the first embodiment at a region A of a hollow region 5 that is close to the tip side, includes meandering flow paths 6 (meandering flow paths 62) of the second embodiment at a middle region B of the hollow region 5, and includes meandering flow paths 6 (meandering flow paths 63) of the third embodiment at a region C of the hollow region 5 that is close to the hub side.

According to the turbine blade 10 of this embodiment having the above-mentioned structure, the cooling efficiencies at the regions in the height direction are different from each other. Accordingly, it is possible to optimize cooling corresponding to the heat load distribution along with the height direction of the turbine blade 10.

Preferred embodiments of the invention have been described above with reference to the accompanying drawings. However, it goes without saying that the invention is not limited to the above-mentioned embodiments. The shapes, combination, and the like of the respective components shown in the above-mentioned embodiments are illustrative, and may be changed in various ways on the basis of design requirements without departing from the scope of the invention.

For example, the repetitive patterns of the meandering flow paths 6 shown in the above-mentioned embodiments, that is, the arrangement patterns of the suction wall surface 5b and the pressure wall surface 5a are illustrative, and may be arbitrarily changed according to cooling the performance required for the turbine blade.

Further, the example shown in the above-mentioned embodiments are cases where the invention is applied to a cooling path of a trailing edge portion of a blade. However, the invention may be applied to other portions of a blade.

INDUSTRIAL APPLICABILITY

According to the invention, it is possible to increase the degree of freedom in the design of an internal structure by proposing a structure of which the rigidity of a core is increased and to further improve the cooling efficiency of the turbine blade by using an optimal structure.

The invention claimed is:

1. A turbine blade that is capable of being cooled by a coolant gas supplied to a hollow region of the turbine blade comprising:
    a pressure wall surface extending from a leading edge portion of the turbine blade to a trailing edge portion of the turbine blade;
    a suction wall surface extending from the leading edge portion of the turbine blade to the trailing edge portion of the turbine blade;
    the hollow region; and
    a plurality of meandering flow paths, formed by elements consisting of the pressure wall surface, the suction wall surface, and protruding portions directly protruding from the pressure wall surface and from the suction wall surface, that guide the coolant gas between the suction wall surface and the pressure wall surface, while causing the coolant gas to repeatedly meander, continuously arranged from a hub side toward a tip side of the turbine blade, adjacent meandering flow paths of the plurality of meandering flow paths causing the coolant gas to meander in different repetitive patterns, each of the plurality of meandering flow paths extending from a portion of the turbine blade, which is between the leading edge portion of the turbine blade and the trailing edge portion of the turbine blade, toward the trailing edge portion of the turbine blade,
    wherein a bottom or a top of the protruding portions of a first one of the plurality of meandering flow paths is located at the same height of the turbine blade as a bottom or a top of the protruding portions of a second one of the plurality of meandering flow paths, the second one of the plurality of meandering flow paths being adjacent to the first one of the plurality of meandering flow paths, the bottom or the top of the protruding portions of the second one of the plurality of meandering flow paths being adjacent to the bottom or the top of the protruding portions of the first one of the plurality of meandering flow paths.

2. The turbine blade according to claim 1,
    wherein repetitive patterns of the adjacent meandering flow paths of the plurality of meandering flow paths have the same periodicity and the phases of the repetitive patterns are shifted from each other by a half period.

3. The turbine blade according to claim 1,
wherein widths of protruding portions protruding from the suction wall surface and the pressure wall surface, which are a part of wall portions forming the plurality of meandering flow paths, are set to be larger than a width of a flow path that is directed to the pressure wall surface from the suction wall surface of the plurality of meandering flow paths and a width of a flow path that is directed to the suction wall surface from the pressure wall surface of the plurality of meandering flow paths.

4. The turbine blade according to claim 1,
wherein the hollow region has an outlet, the outlet is spaced away from the trailing edge portion of the turbine blade in a direction toward the leading edge portion of the turbine blade, and the outlet allows the coolant gas, which exits from each of the ends of the plurality of meandering flow paths located toward the trailing edge portion of the turbine blade, to exit the hollow region.

5. A turbine blade that is capable of being cooled by a coolant gas supplied to a hollow region of the turbine blade comprising:
a pressure wall surface;
a suction wall surface;
the hollow region; and
a plurality of meandering flow paths that guide the coolant gas between the suction wall surface and the pressure wall surface, while causing the coolant gas to repeatedly meander, continuously arranged from a hub side toward a tip side of the turbine blade, and adjacent meandering flow paths of the plurality of meandering flow paths causing the coolant gas to meander in different repetitive patterns,
wherein repetitive patterns of the adjacent meandering flow paths of the plurality of meandering flow paths have the same periodicity and the phases of the repetitive patterns are shifted from each other by a quarter period.

* * * * *